Sept. 20, 1971    L. A. CHESHIER    3,606,112
RETRACTABLE BEVERAGE HOLDER FOR MOTOR VEHICLES
Filed Jan. 28, 1970    3 Sheets-Sheet 1
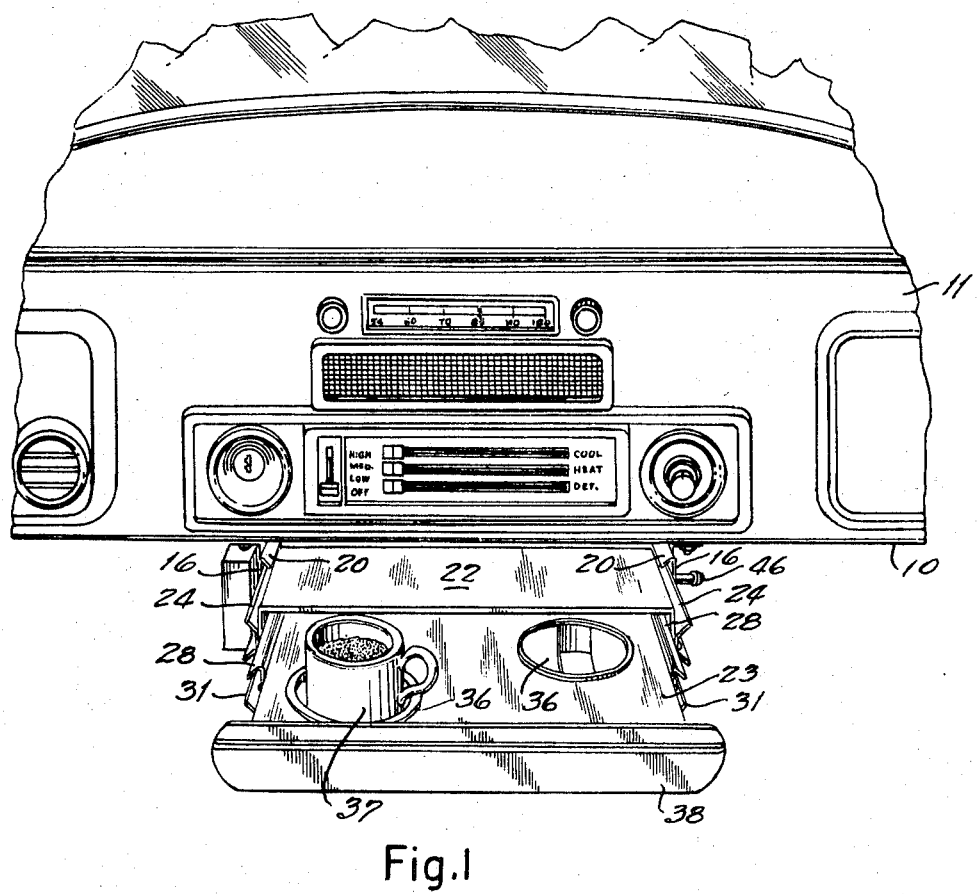
INVENTOR
Leonard A. Cheshier
BY
ATTORNEY INVENTOR
Leonard A. Cheshier
BY
ATTORNEY Sept. 20, 1971          L. A. CHESHIER          3,606,112

RETRACTABLE BEVERAGE HOLDER FOR MOTOR VEHICLES

Filed Jan. 28, 1970          3 Sheets-Sheet 3

INVENTOR
Leonard A. Cheshier
BY
ATTORNEY

United States Patent Office 3,606,112
Patented Sept. 20, 1971

3,606,112
RETRACTABLE BEVERAGE HOLDER FOR MOTOR VEHICLES
Leonard A. Cheshier, 830 Fairwood, Dallas, Tex. 75232
Filed Jan. 28, 1970, Ser. No. 6,414
Int. Cl. B60r 7/00
U.S. Cl. 224—42.44                        5 Claims

ABSTRACT OF THE DISCLOSURE

A beverage holder for motor vehicles adapted for attachment to the instrument panel thereof and retractable beneath the panel, its telescoping frame members providing for maximum extension while affording compact retractability. The device includes a conveniently accessible coin dispensing feature and means for attaching thereto such accessories as tissue dispensers and litter bags.

BACKGROUND OF THE INVENTION

A variety of beverage holders for motorists have been devised to afford convenient means for serving refreshments while in transit, or when being served at drive-in food dispensaries, some of which are in some manner attached to the vehicle instrument panel and capable of retractability therebeneath, but most such devices are designed for arrangement on the vehicle floor or equipped for suspension on a door, or other part of the vehicle, and when not in use must be stored in some part of the vehicle in which space is generally at a premium. Such devices can thus create a nuisance for the passengers, and in some instances, a hazard to the proper control of the vehicle.

Beverage holders which are designed for retraction beneath the instrument panel, or dash, are generally more desirable since less space is required for storage thereof but due to the limited amount of space which is available in the modern automobile most such retractable devices lack sufficient surface area, when extended for use, to adequately accommodate normal requirements for safely supporting beverage containers and other articles of food.

SUMMARY

This invention relates to a retractable beverage holder for motor vehicles adapted for attachment to and retractable beneath the vehicle instrument panel or dash.

A primary object of the invention resides in the provision of a retractable support for beverage containers, such as cups, glasses, beverage cans, and the like, for installation as an accessory or as standard equipment in a motor vehicle for the service of food and refreshments for passengers therein while in transit, and affording a spacious and convenient surface area when extended while occupying a minimum of space when retracted.

A further object of the invention is that of providing a beverage holder for automobiles in which is embodied a coin dispensing device in ready access to the vehicle operator for producing coins for tollway fees, and other similar items where ready change is required, resulting in substantial savings in time and with a minimum of inconvenience.

A still further object of the invention is that of affording a retractable food and beverage service device which is capable of being handily stored beneath the vehicle instrument panel in as inconspicuous manner while conveniently accessible at all times, having a plurality of sets of telescoping supporting members enabling the device to be extended to expose a liberal surface area for refreshments and for other purposes as desired.

While the foregoing objects are paramount, other and lesser objects will become apparent as the description proceeds when considered with the appended drawings wherein:

FIG. 1 is a fragmentary elevational view of a typical dash or instrument panel of a typical automobile showing the invention installed therein and in extended position.

FIG. 2 is a left side elevational view of the invention in extended position, the vehicle fire wall and dash being fragmentarily shown in section, and showing a beverage container and tissue dispenser in broken lines.

FIG. 3 is a left side elevational view of the invention in retracted position, the vehicle dash and a rear supporting bracket being fragmentarily shown.

Figure 4:
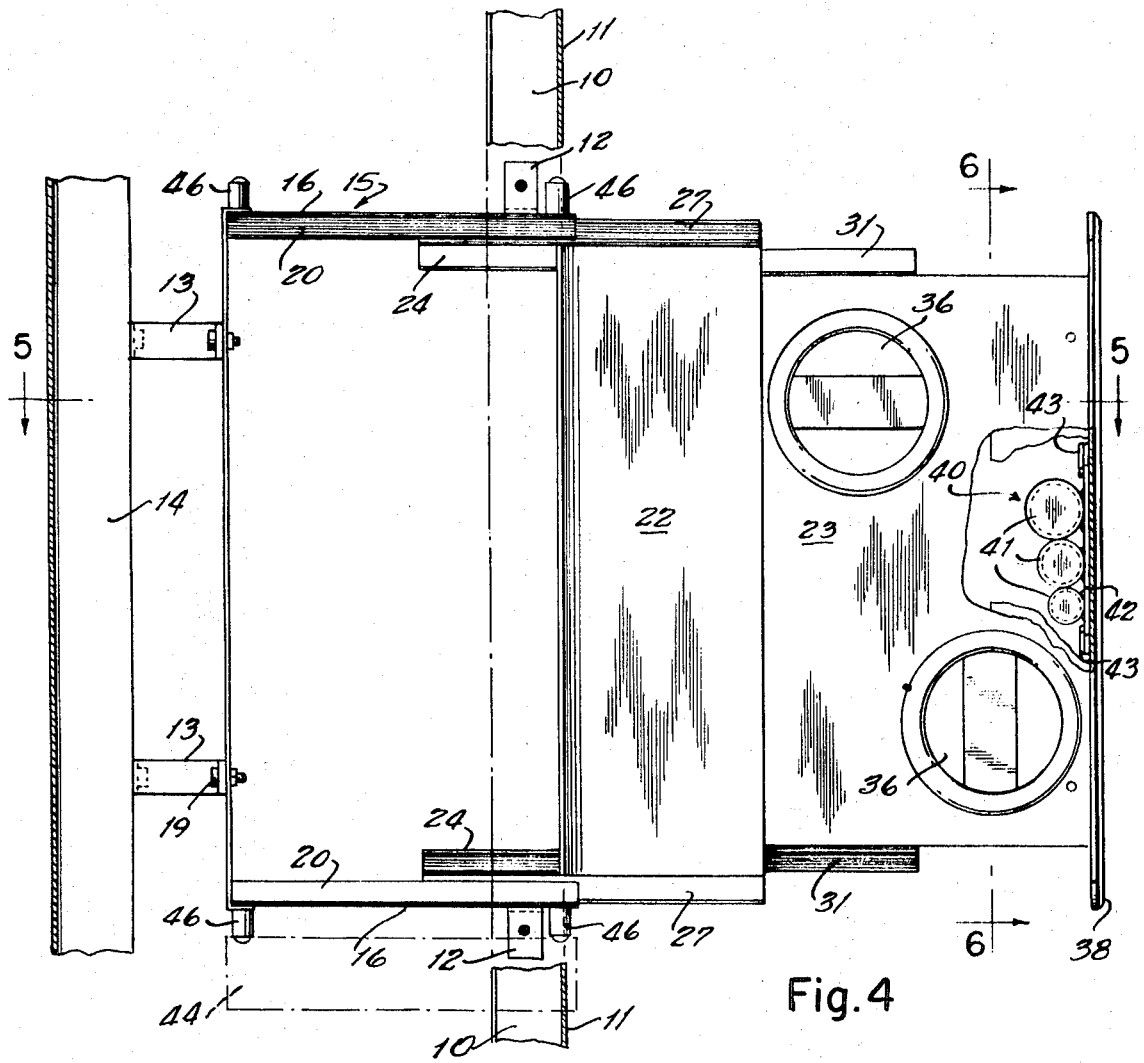
FIG. 4 is a plan view of the invention in extended position, showing a plurality of receptacle wells and showing a portion broken away to illustrate a coin dispenser, the vehicle fire wall and dash being fragmentarily shown in section.

The invention is especially adapted for attachment to the lower edge 10 of the dash or instrument panel 11 of a typical automobile (not shown) by a pair of brackets 12, or other suitable device, and by brackets 13 to the firewall 14, as shown in FIGS. 1, 2, 4 and 5.

The assembly primarily comprises a housing 15 having side walls 16 and a rear wall 17, the top, bottom and front being open. The supporting brackets 12 are attached forwardly of the side walls 16 by bolts 18 and the brackets 13 are secured by bolts 19 to the rear wall 17, in the manner shown in FIGS. 2, 3, 4 and 5. The side walls 16 have internal flanges 20 which are opposingly inclined at obtuse angles forming channels 21, as best shown in FIGS. 7, 8 and 9 to slidably receive the first of a series of telescopically associated pairs of sections comprising the extensible frame assembly for supporting the sectional tabular members 22 and 23 which will be presently described.

Figure 7:
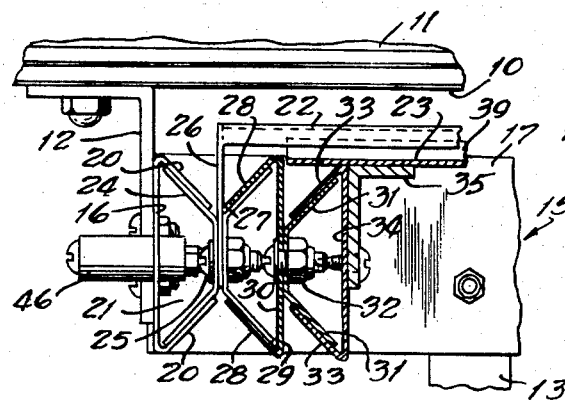
FIG. 7 is a fragmentary sectional view, on line 7—7 of FIG. 2, showing the several telescoping frame members.
Figure 8:
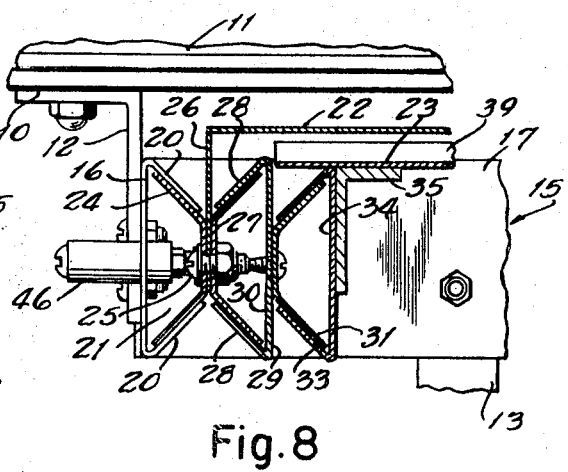
FIG. 8 is another fragmentary sectional view, on line 8—8 of FIG. 2, similar to that shown in FIG. 7.
Figure 9:
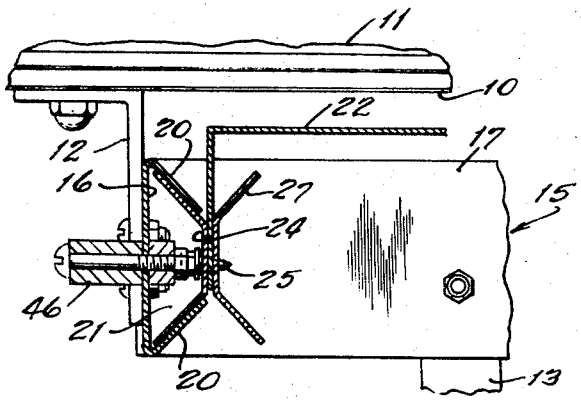
FIG. 9 is still another fragmentary sectional view, on line 9—9 of FG. 2, showing the innermost frame members.

The innermost or first of the telescoping sections comprises elongated plates 24 attached by screws 25 to the depending flanges 26 on each side of the tabular member 22, and the plates 24 have longitudinal planar medial portions, through which the screws 25 are arranged, while their opposing side portions extend outwardly at opposing obtuse angles from the flanges 26 of the member 22 in the same planes as those of the internal angular flanges 20 of the side walls 16 of the housing 15 and are slidably received therebetween, as shown best in FIGS. 7, 8 and 9.

Attached to the inner surfaces of the depending flanges 26 of the tubular member 22 by the screws 25 are elongated plates 27 which are identical with the plates 24 but in opposing arrangement, their obtusely angular portions being slidably received between the obtusely angular flanges 28 of channel-shaped members 29 to the planar portions 30 of which are attached elongated plates 31, and opposite the angular flanges 28 of the members 29. The plates 31 are identical in form to the plates 24 and 27 and are secured by screws or bolts 32 to the members 29, the obtusely angular portions of the plates 31 being conformably and slidably received between the obtusely angular flanges 33 of channel-shaped members 34 which are secured by brackets 35 to the opposing sides of the tabular member 23 and depend therefrom, as shown in FIGS. 7 and 8.

Figure 5:
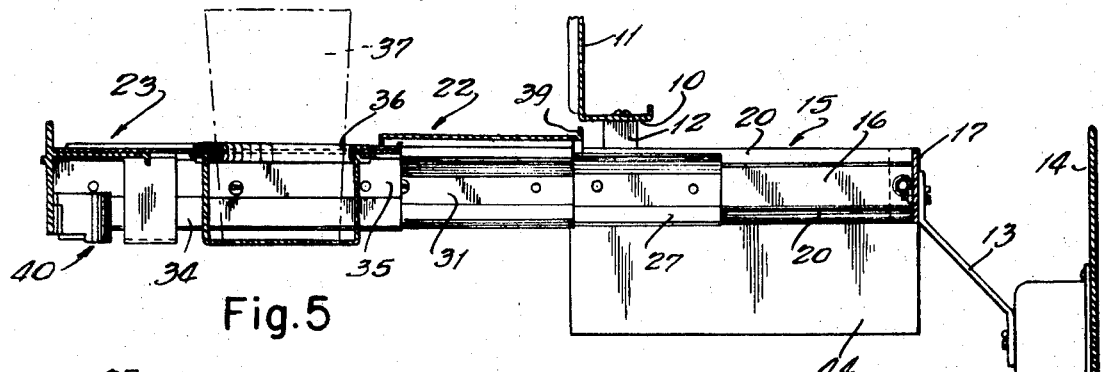
FIG. 5 is a sectional view, on line 5—5 of FIG. 4, showing the relation of the supporting surfaces to the telescoping frame members and showing a receptacle well and the coin dispenser, the vehicle firewall and dash being fragmentarily shown in section.
Figure 6:
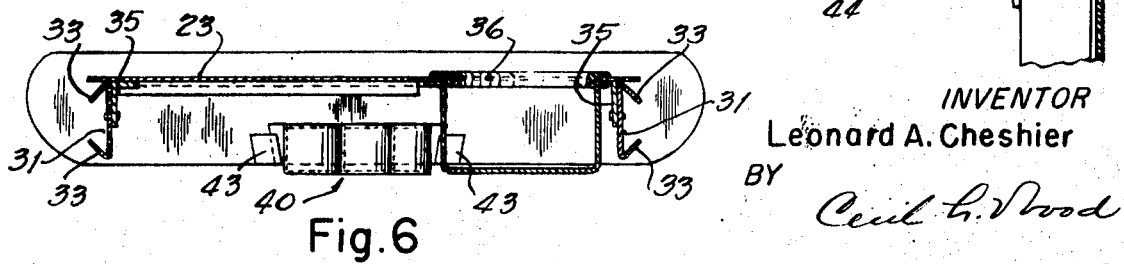
FIG. 6 is a sectional view, on line 6—6 of FIG. 4, showing the rear surface of the front plate, a receptacle well and the coin dispenser, and showing a set of the telescoping frame members.
Figure 13:
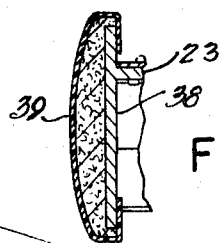
FIG. 13 is a fragmentary transverse sectional view of a padded cover for the front plate of the assembly.

The tabular section 23 is planar and has a plurality of receptacles 36 formed therein to receive such items as cups or other containers 37, shown in FIG. 1 and in broken lines in FIGS. 2 and 5. A panel 38 is secured across the front of the section 23, as best shown in FIGS. 1 and 4, and may have the padded cover 39 thereon which is shown fragmentarily and in section in FIG. 13, if desired. An upturned flange 39 is formed along the rear marginal edge of the section 23.

Figure 10:
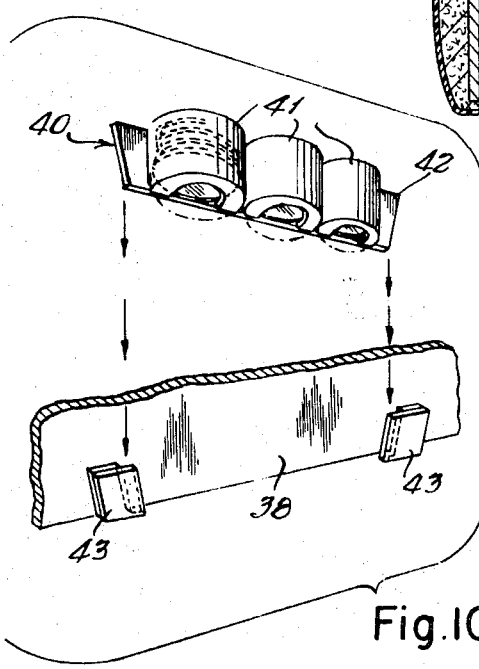
FIG. 10 is an exploded view of the coin dispenser, shown in perspective, and fragmentarily showing the rear surface of the front plate of the assembly having keepers thereon for detachably supporting the coin dispenser.
Figure 11:
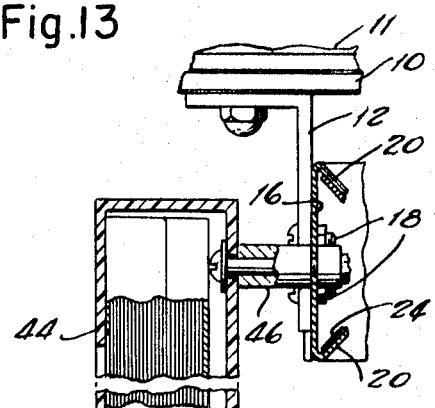
FIG. 11 is a fragmentary sectional view similar to FIG. 7 but showing a tissue dispenser attached to the assembly by the laterally extended post on one side of the main housing.

A coin dispenser 40 is detachably secured beneath the front edge of the tabular section 23, and behind the panel 38, as shown in FIGS. 2, 3, 4, 5 and 6, and in a fragmentary exploded view in FIG. 10. The dispenser 40 may be of any desired form and adapted to contain coins of different denominations in separate compartments 41, as depicted in FIGS. 1 and 10, from which coins can be withdrawn from the bottom. The compartments 41 can be arranged on a plate 42 removably supported in keepers 43 attached to the rear surface of the panel 38 in the manner shown fragmentarily in FIG. 10.

Figure 12:
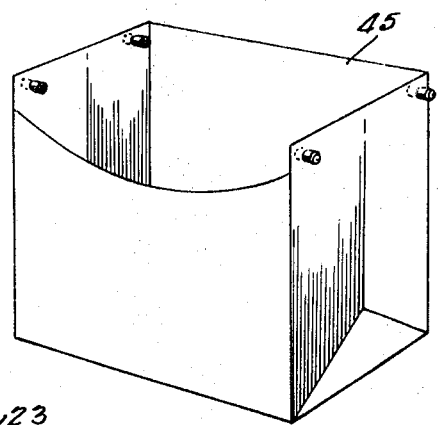
FIG. 12 is a perspective view of a typical litter bag adapted for attachment to the invention and suspended therebeneath.

Other accessories, such as a tissue dispenser 44 or a litter container 45 may be conveniently attached to the assembly, as indicated in FIGS. 2, 4, 5 and 11, through the medium of studs 46. A typical litter container is shown in FIG. 12.

The invention is obviously capable of certain changes and modifications in form and arrangement of parts, by persons skilled in the art, without departing from the spirit thereof or the scope of the appended claims.

What is claimed is:

1. A beverage holder for motor vehicles adapted for attachment to the instrument panel thereof and retractable therebeneath, the combination comprising, a rectangular housing having side walls and a rear wall, the side walls having a first set of channels formed internally and longitudinally thereof, a first tabular member having a depending flange along each side, said flanges having a first set of mating elements secured externally thereof and slidably receivable in said first channels, a second tabular member having a second set of channels secured along the sides thereof and depending therefrom, a third set of channels intermediate said first and second sets of channels, a third set of channels having a second set of mating elements thereon slidably receivable in said second set of channels, and a third set of mating elements on the inner surface of said depending flanges of said first tabular member, opposite said first set of mating elements, slidably receivable in said third set of channels.

2. A beverage holder as described in claim 1, the said sets of channels and mating elements being telescopically joined whereby said first and second tabular members can be retracted into said housing.

3. The beverage holder of claim 1, the said second tabular member having a depending panel along its forward edge, and a coin dispenser detachably secured to the rear surface of said panel.

4. The beverage holder of claim 1, the said first sets of channels and mating elements having telescoping connection with said second sets of channels and mating elements through said third sets of channels and mating elements.

5. The beverage holder of claim 1, and means on said housing for attaching accessories thereto.

References Cited

UNITED STATES PATENTS

| 2,719,066 | 9/1955 | Budzinski | 108—143X |
| 2,825,611 | 3/1958 | Aynesworth | 108—45 |
| 3,133,768 | 5/1964 | Klakovich | 312—338UX |

GERALD M. FORLENZA, Primary Examiner

J. M. FORSBERG, Assistant Examiner

U.S. Cl. X.R.

108—143, 45; 312—334; 308—3.6